United States Patent
Han et al.

(10) Patent No.: US 11,613,008 B2
(45) Date of Patent: Mar. 28, 2023

(54) AUTOMATING A PROCESS USING ROBOTIC PROCESS AUTOMATION CODE

(71) Applicant: INTERNATIONAL BUSINESS MACHINES CORPORATION, Armonk, NY (US)

(72) Inventors: Xue Han, Beijing (CN); Ya Bin Dang, Beijing (CN); Li Jun Mei, Beijing (CN); Qi Cheng Li, Beijing (CN); Lian Xue Hu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1110 days.

(21) Appl. No.: 16/246,728

(22) Filed: Jan. 14, 2019

(65) Prior Publication Data

US 2020/0223061 A1 Jul. 16, 2020

(51) Int. Cl.
B25J 9/16 (2006.01)
B25J 13/06 (2006.01)
G06F 40/279 (2020.01)

(52) U.S. Cl.
CPC .............. *B25J 9/163* (2013.01); *B25J 13/06* (2013.01); *G06F 40/279* (2020.01); *G05B 2219/50391* (2013.01)

(58) Field of Classification Search
CPC ......... B25J 9/163; B25J 13/06; G06F 40/279; G05B 2219/50391
See application file for complete search history.

(56) References Cited

U.S. PATENT DOCUMENTS

| 7,765,097 | B1 | 7/2010 | Yu et al. | |
| 8,073,827 | B2* | 12/2011 | Iwasaki | G06F 9/5038 |
| | | | | 707/703 |
| 8,407,661 | B2 | 3/2013 | Wang et al. | |
| 9,081,579 | B2* | 7/2015 | Sharrma | G06F 8/64 |
| 9,280,322 | B2* | 3/2016 | Reyes Lozano | G06F 8/77 |
| 10,055,681 | B2* | 8/2018 | Brown | G06N 3/008 |
| 10,521,196 | B1* | 12/2019 | Wang | G06F 8/34 |
| 10,860,800 | B2* | 12/2020 | Sakai | G06N 20/00 |

(Continued)

OTHER PUBLICATIONS

Do, Hyun Min, Chanhun Park, and Jin Ho Kyung, "Dual Arm Robot for Packaging and Assembling of IT Products", 2012, 2012 IEEE International Conference on Automation Science and Engineering (CASE), pp. 1067-1070. (Year: 2012).*

(Continued)

*Primary Examiner* — Daniel C Washburn
*Assistant Examiner* — James Boggs
(74) *Attorney, Agent, or Firm* — Tutunjian & Bitetto, P.C.; Joseph Petrokaitis

(57) ABSTRACT

A system for automating a process using robotic process automation code includes a memory device for storing program code, and at least one processor device operatively coupled to the memory device. The at least one processor device is configured to execute program code stored on the memory device to process, based on a contextual dictionary, a process description document associated with a process to be automated by a robotic process automation system, automatically generate robotic process automation code based on the processing, and execute the robotic process automation code for automating the process.

14 Claims, 9 Drawing Sheets

(56) References Cited

U.S. PATENT DOCUMENTS

| | | |
|---|---|---|
| 2016/0357519 A1 | 12/2016 | Vargas |
| 2017/0001308 A1 | 1/2017 | Bataller et al. |
| 2018/0074931 A1 | 3/2018 | Garcia et al. |
| 2018/0143970 A1* | 5/2018 | Skarbovsky ........ G10L 15/1822 |
| 2019/0138511 A1* | 5/2019 | Margiolas ........... G06F 16/9535 |

OTHER PUBLICATIONS

Dubey, Evaluating Software Engineering Methods in the Context of Automation Applications, 2011 9th IEEE International Conference on Industrial Informatics, Oct. 6, 2011, IEEE.

* cited by examiner

AUTOMATING A PROCESS USING ROBOTIC PROCESS AUTOMATION CODE

BACKGROUND

Technical Field

The present invention generally relates to artificial intelligence and machine learning, and more particularly to automating a process using robotic process automation code.

Description of the Related Art

Process automation systems can be used to automatically control processes in a variety of areas, which can improve enterprise efficiency by, e.g., reducing an amount of manual intervention. One example of a process automation system is a robotic process automation system. Robotic process automation systems can use intelligent agents (e.g., robots) to automate tasks (e.g., rules-based or knowledge-based processes) within an architecture, thereby reducing or eliminating manual task performance. Additionally, robotic process automation systems can be used to provide information technology support and management, such as, e.g., monitoring devices on a network to improve process throughput. Robotic process automation systems can be used in a wide variety of industries, including but not limited to healthcare, insurance, banking, information technology and information technology.

SUMMARY

In accordance with an embodiment of the present invention, a system for automating a process using robotic process automation code is provided. The system includes a memory device for storing program code, and at least one processor device operatively coupled to the memory device. The at least one processor device is configured to execute program code stored on the memory device to process, based on a contextual dictionary, a process description document associated with a process to be automated by a robotic process automation system, automatically generate robotic process automation code based on the processing, and execute the robotic process automation code for automating the process.

In accordance with another embodiment of the present invention, a computer-implemented method for automating a process using robotic process automation code is provided. The method includes processing, based on a contextual dictionary, a process description document associated with a process to be automated by a robotic process automation system, automatically generating robotic process automation code based on the processing, and executing the robotic process automation code for automating the process.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
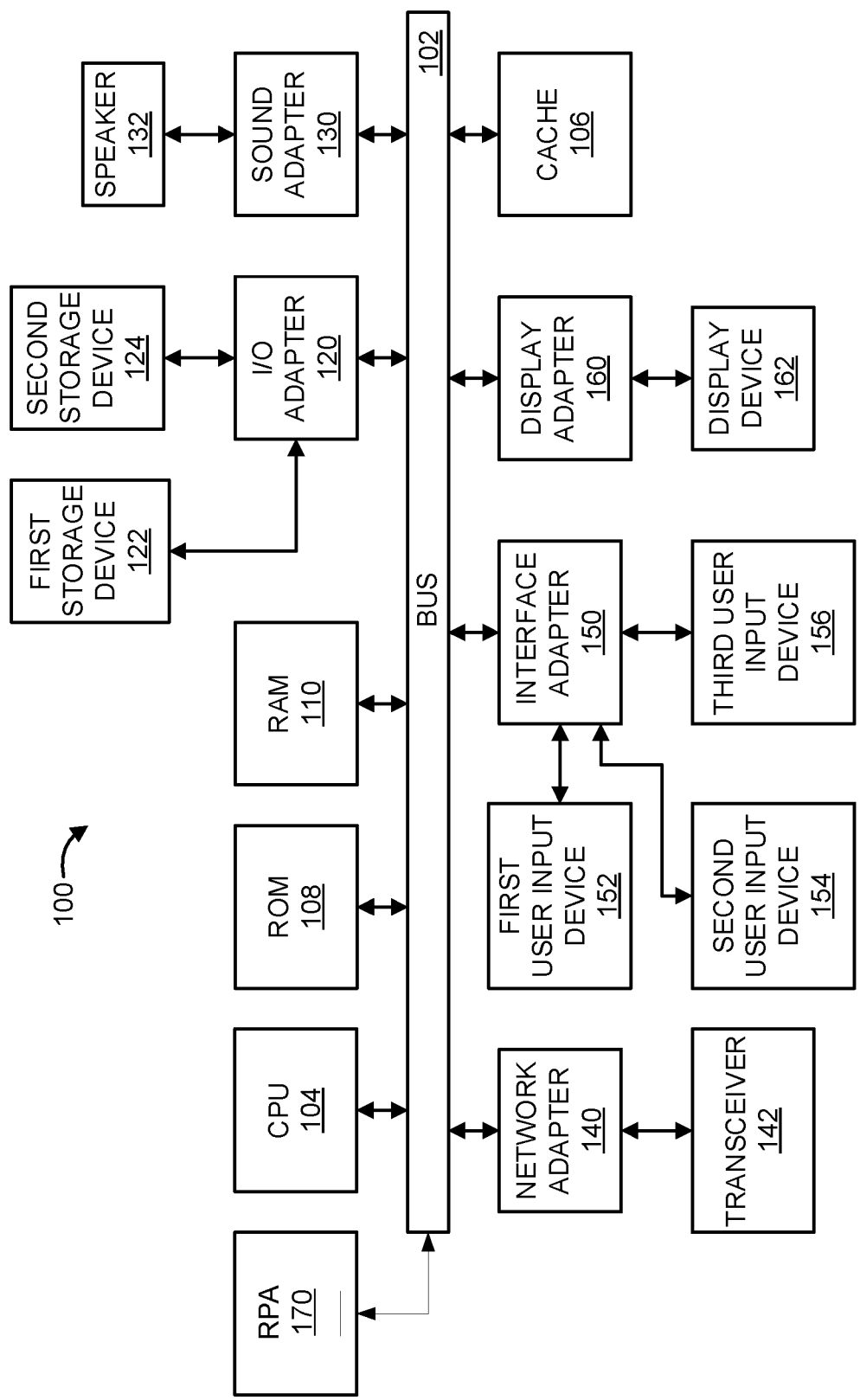
FIG. 1 is a block diagram of a processing system, in accordance with an embodiment of the present invention.

Generally, robotic process automation systems can rely on manual coding by a developer to generate code executed by the intelligent agents. To do this, the developer may have to understand the process that is being automated by the robotic process automation system, and may have to be familiar with various components of the robotic process automation system (e.g., application programming interfaces (APIs)). Additionally, an understanding of actions and operating applications in each step of a process implemented by a robotic process automation system is needed. Accordingly, manually generating code for implementing a process automated by a robotic process automation system can be time consuming and/or costly.

The embodiments described herein provide for automating a process using robotic process automation code. The robotic process automation code can be automatically generated using artificial intelligence. More specifically, the embodiments described herein can enhance identification of actions in the process being automated (e.g., verbs from steps of the underlying process) using artificial intelligence technology (e.g., natural language processing (NLP) and image recognition) to automatically generate robotic process automation code for automating the process.

For example, the embodiments described herein can improve the accuracy in identifying parts of speech for words in a step of a process implemented by a robotic process automation system for tokenization, which can reduce ambiguity with respect to the part of speech of a given word. For instance, a cause of low accuracy in identifying the verb in a sentence can be that the step description can include out-of-vocabulary proper nouns that confuse the tokenizer. By reducing the potential for ambiguity with respect to identifying the part of speech of a given word used to automatically generate the robotic process automation code, the accuracy of verb identification in a sentence is increased. Accordingly, the embodiments described herein can improve the accuracy of understanding of the overall process, thereby improving a process automation system implementing the robotic process automation code.

More specifically, the embodiments described herein can identify verb-object pairs (e.g., using named-entity recognition (NER)). To do this, a corpus for each application can be built using data including, e.g., screenshots, videos, attachments and flowcharts. Examples of application include, but are not limited to, Excel® and SAP®. Terms in the corpus can be classified according to application. For example, for Excel®, the terms can be classified as tab name, column name, etc., and for SAP®, the terms can be classified as button name, service name, operation, etc. To identify the action for each step description in the process, a maximum matching algorithm can be used to match terms in the corpus. The matched terms can be substituted with tags, and NLP tools can be used to identify the action in each step based on part of speech analysis.

To illustrate how the embodiments described herein can improve robotic process automation system technology, the example sentence "On the left side of the screen, open the folder Customer Inquiry and then select 'Customers—View Only'" can be tokenized using conventional means as follows:
[(u'On', u'IN'), (u'the', u'DT'), (u'left', u'JJ'), (u'side', u'NN'), (u'of', u'IN'), (u'the', u'DT'), (u'screen', u'NN'), (u',', u','), (u'open', u'VB'), (u'the', u'DT'), (u'folder', u'NN'), (u'Customer', u'NNP'), (u'Inquiry', u'NNP'), (u'and', u'CC'), (u'then', u'RB'), (u'select', u'JJ'), (u'Customers', u'NNS'), (u'View', u'NNP'), (u'Only', u'RB')]).
Here, "IN" refers to a preposition or subordinating conjunction, "DT" refers to a determiner, "JJ" refers to an adjective, "NN" refers to a singular noun, "NNP" refers to a proper noun, "NNS" refers to a plural noun, "VB" refers to the base form of a verb, "CC" refers to a coordinating conjunction, and "RB" refers to an adverb. As can be seen, the word "select" has been tokenized as an adjective in the example sentence. However, the word "select" is actually being used as verb in the example sentence, and thus the tokenization has failed to properly tokenize the word "select" with respect to the example sentence.

Referring now to the drawings in which like numerals represent the same or similar elements and initially to FIG. 1, an exemplary processing system 100 to which the present invention may be applied is shown in accordance with one embodiment. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Robotic process automation (RPA) component 170 may be operatively coupled to system bus 102. RPA component 170 is configured to perform one or more of the operations described below for automating a process using robotic process automation code. RPA component 170 can be implemented as a standalone special purpose hardware device, or may be implemented as software stored on a storage device. In the embodiment in which RPA component 170 is software-implemented, although shown as a separate component of the computer system 100, RPA component 170 can be stored on, e.g., the first storage device 122 and/or the second storage device 124. Alternatively, RPA component 170 can be stored on a separate storage device (not shown).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
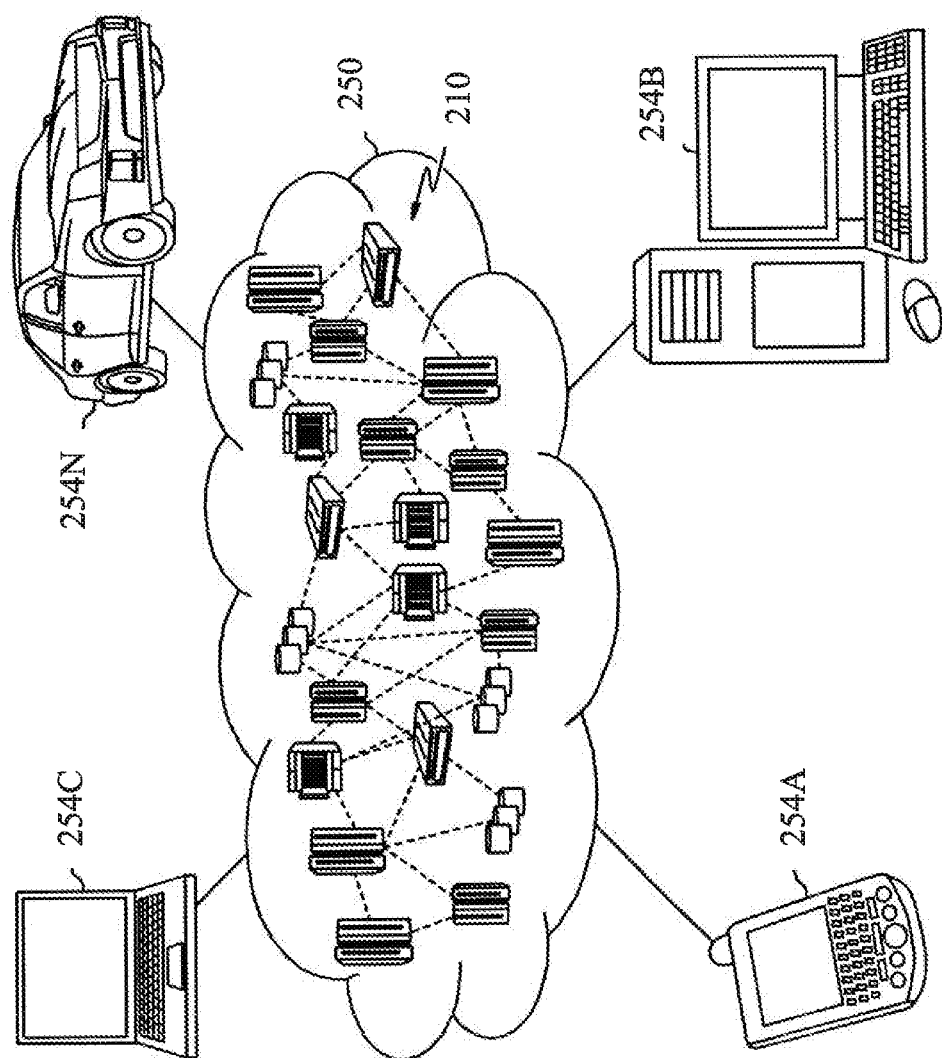
FIG. 2 is a block diagram of an illustrative cloud computing environment having one or more cloud computing nodes with which local computing devices used by cloud consumers communicate, in accordance with an embodiment of the present invention.

Referring now to FIG. 2, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 150 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
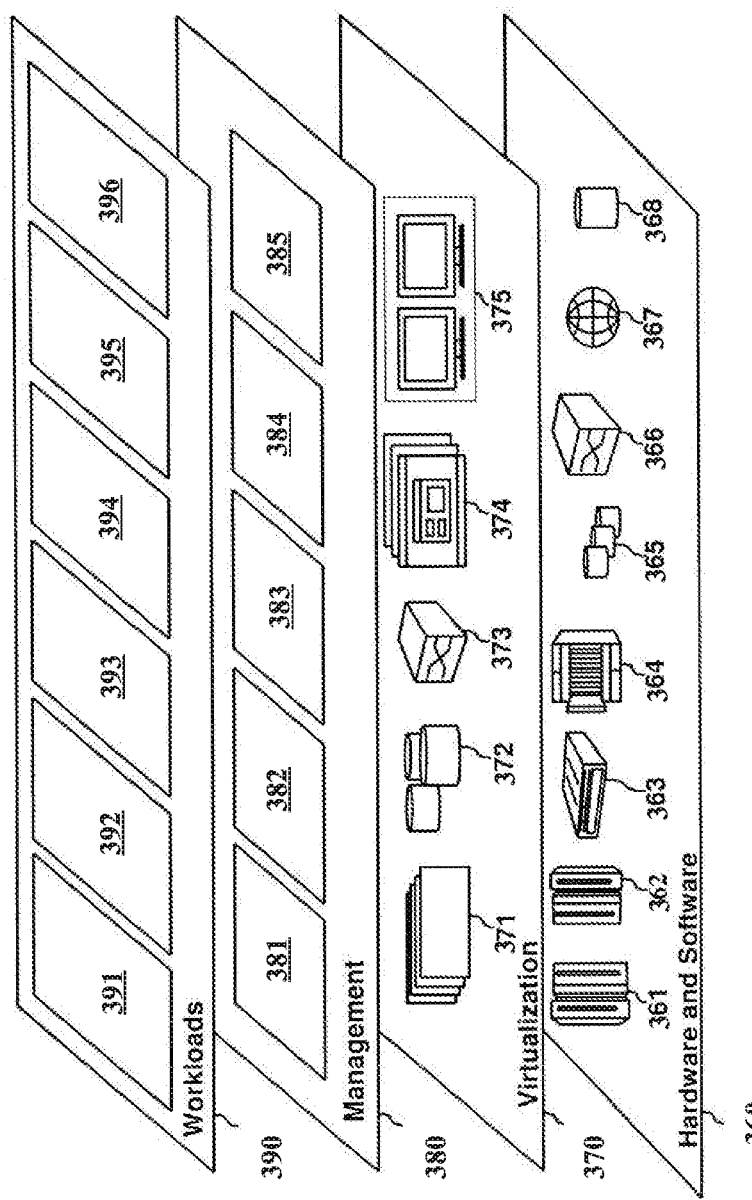
FIG. 3 is a block diagram of a set of functional abstraction layers provided by a cloud computing environment, in accordance with an embodiment of the present invention.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and robotic process automation 396.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
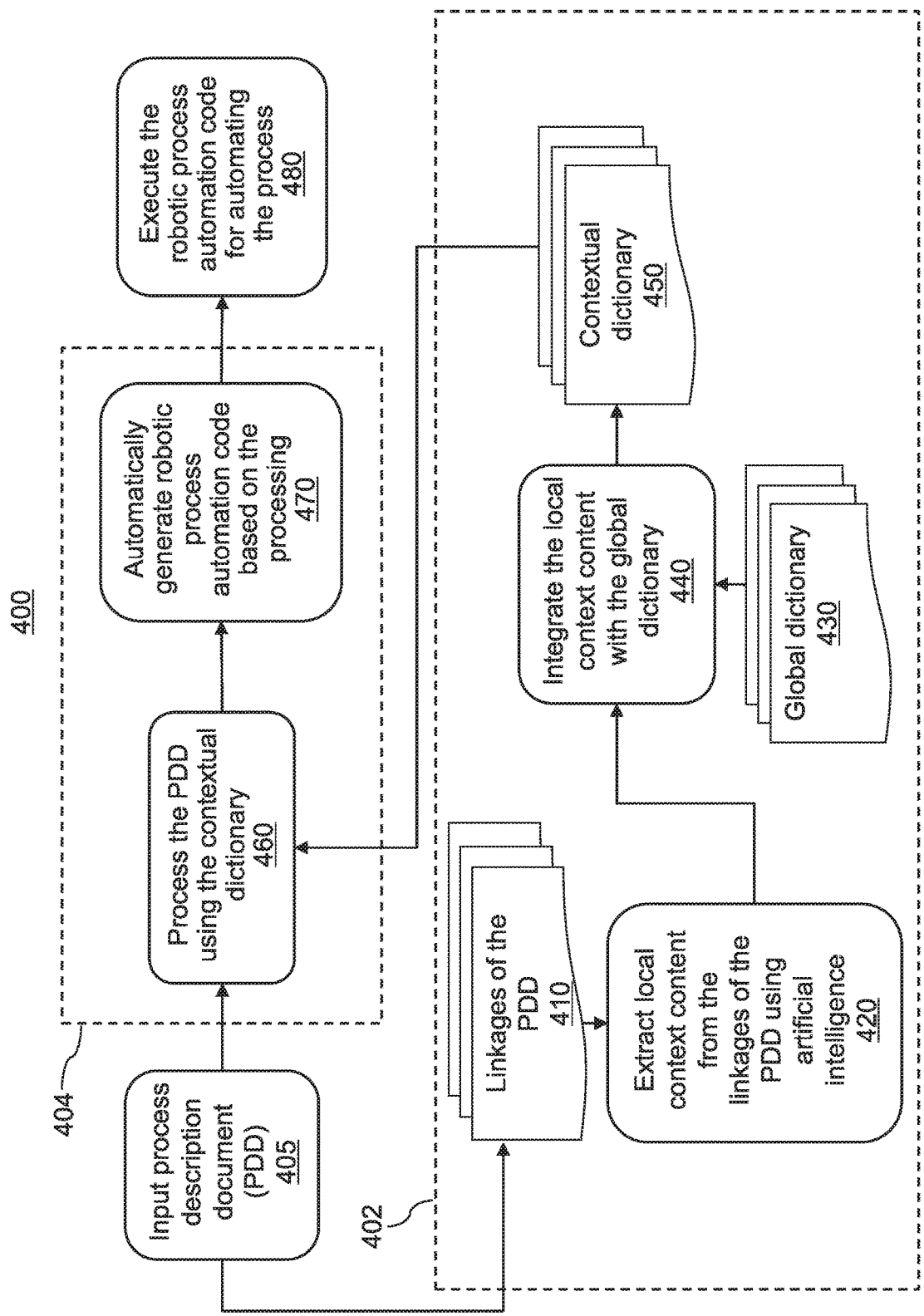
FIG. 4 is a block/flow diagram of a system/method for automating a process using robotic process automation code, in accordance with an embodiment of the present invention.

With reference to FIG. 4, a block/flow diagram is provided illustrating a system/method 400 for automating a process using robotic process automation code. As will be described in further detail below, the robotic process automation code generated by the system/method 400 can be executed by, e.g., an intelligent agent for performing a process associated with a practical application. As shown, the system/method 400 can be divided into a corpus building portion 402 and a robotic process automation (RPA) code generation portion 404.

At block 405, a process description document (PDD) is input into both the corpus building portion 402 and the RPA code generation portion 404. The PDD can include a plurality of linkages that describe a process. Examples of linkages that can be found in the PDD include, but are not limited to, screenshots, attachments, universal resource locators (URLs), videos, etc.

In the corpus building portion 402, the linkages of the PDD are processed at block 410, and local context content is extracted from the linkages of the PDD using artificial intelligence at block 420. For example, local context content from pictures, attachments, URLs, etc. of the PDD can be extracted using artificial intelligence. Illustratively, the local context content can include phrases that are extracted using, e.g., an optical character recognition (OCR) technique. OCR techniques can convert images of text into machine-encoded text. However, any suitable technique can be used to extract the local context content in accordance with the embodiments described herein.

At block 440, the local context content is integrated with a global dictionary 430 to build a contextual dictionary 450. Building the contextual dictionary 450 can include matching the local context content (e.g., phrases) with the global dictionary 430. For example, a maximum matching algorithm can be used to search the global dictionary 430 based on the local context content to build the contextual dictionary 450, as described in further detail below with reference to FIG. 8. However, other suitable matching techniques can be used to build the context dictionary 450 in accordance with the embodiments described herein (e.g., a reverse maximum matching algorithm or a bi-directional maximum matching algorithm). Accordingly, the contextual dictionary 450 can be specific to the local context content.

The global dictionary 430 can be a pre-defined or pre-built dictionary including information that can be used to obtain part of speech results. For example, the global dictionary 430 can include tags related to named-entity recognition (NER) buttons, tabs, etc., for increasing the accuracy of phrase and type extraction. Additionally, the global dictionary 430 can further include information relating to a target system, which can be useful for code generation. An example of a global dictionary will now be described with reference to FIG. 5.

Figure 5:
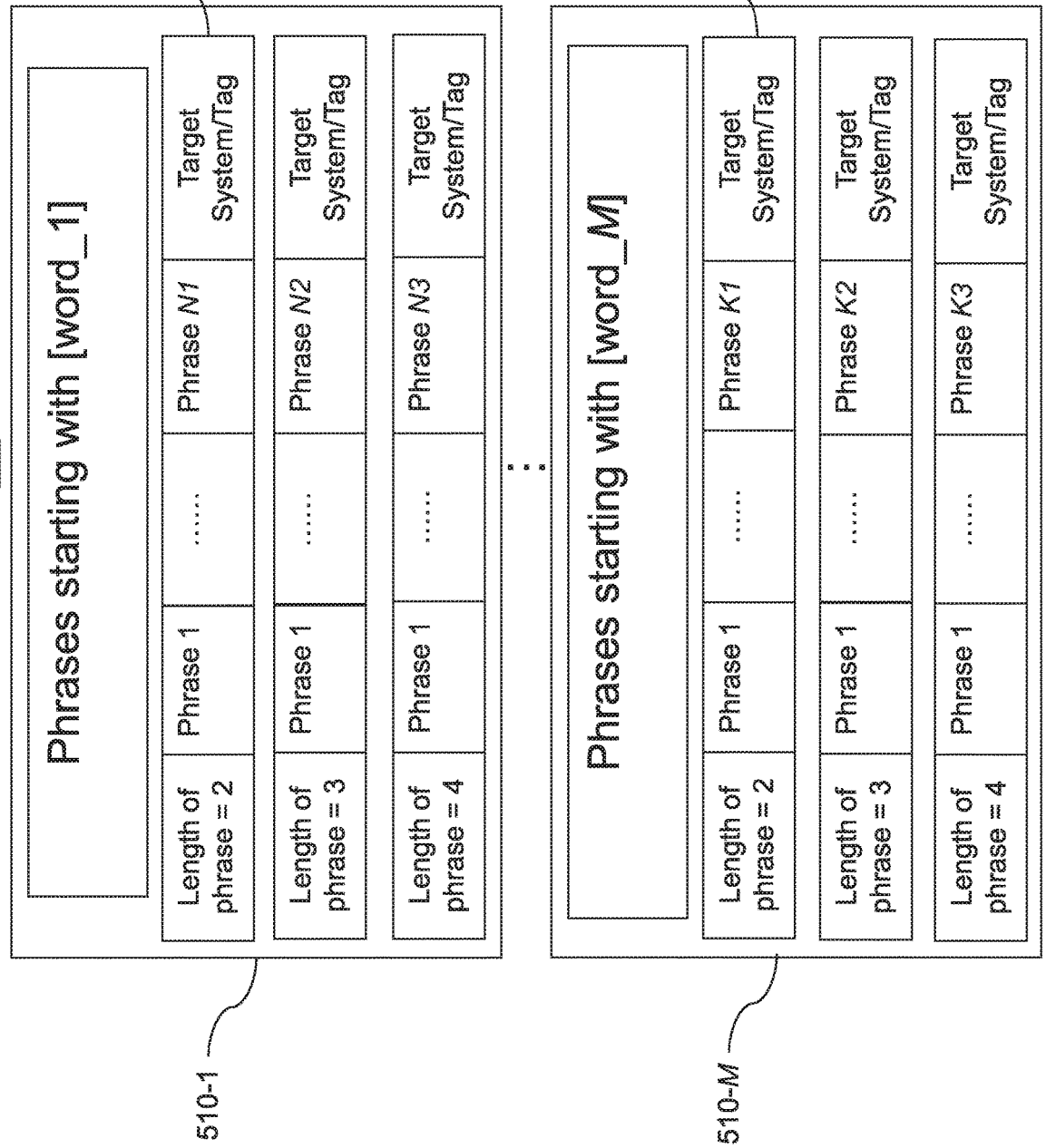
FIG. 5 is a diagram of a structure of a global dictionary, in accordance with an embodiment of the present invention.

With reference to FIG. 5, a diagram is provided illustrating a global dictionary 500. As shown, the global dictionary 500 includes a plurality of sections 510-1 through 510-M that each corresponding to phrases starting with a respective word. For example, section 510-1 includes phrases starting with [word_1], while section 510-M includes phrases starting with [word_M].

The phrases within each section 510-1 through 510-M can be arranged by length. For example, row 512-1 is shown including N1 phrases that start with [word_1] and have a length equal to 2, while row 512-M is shown including K1 phrases that start with [word_M] and have a length equal to 2. Although lengths of 2, 3 and 4 are shown in sections 510-1 and 510-M, such an embodiment should not be considered limiting. For example, phrase lengths of less than 2 or greater than 4 can be realized. Additionally, each row can include target system information and a tag (for type). Each tag defines what each phrase is (e.g., a button, a title or a URL). The target system information, although not needed for obtaining part of speech results, can be useful for code generation. Further details regarding the global dictionary will be described below with reference to FIG. 7.

Referring back to FIG. 4, the contextual dictionary 450 can take the same or similar form as the global dictionary 430. As will be described in further detail, the contextual dictionary 450 can be used for precise natural language understanding (NLU) analysis for the plaintext of each step description of a process associated with the PDD to enhance an understanding of the PDD. More specifically, the contextual dictionary 450 can be used to identify actions/objects in each step.

The contextual dictionary 450 can be built for an application. Examples of applications include, but are not limited to, Excel® and SAP®. Terms in the contextual dictionary 450 can be classified according to the application. For example, for Excel®, the terms in the contextual dictionary 450 can be classified as tab name, column name, etc., and for SAP®, the terms can be classified as button name, service name, operation, etc.

An illustrative example of building a contextual dictionary will now be described with reference to FIG. 6.

Figure 6:
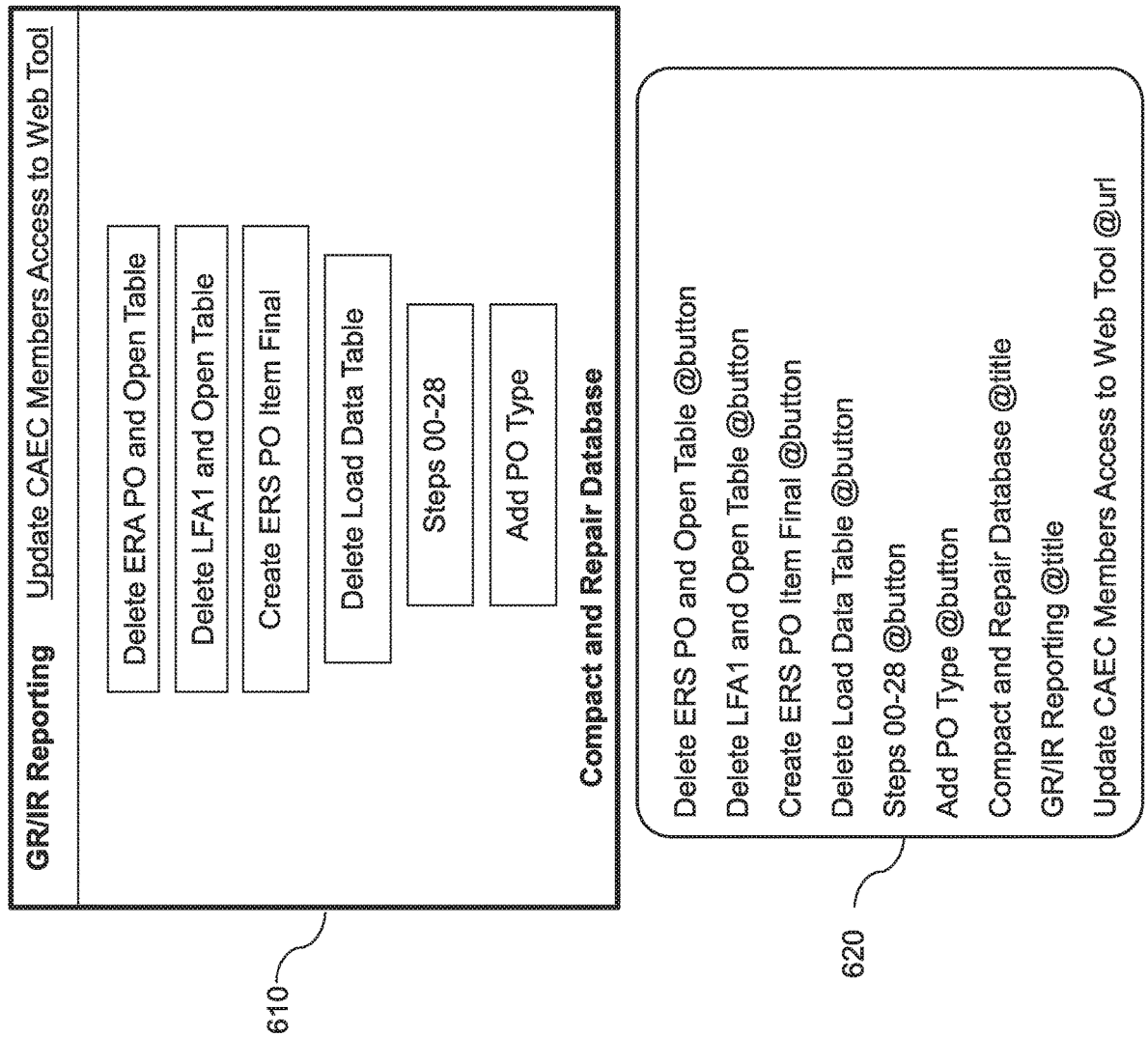
FIG. 6 is a diagram of building an exemplary contextual dictionary for automatically generating robotic process automation code using artificial intelligence, in accordance with an embodiment of the present invention.

With reference to FIG. 6, a diagram 600 is provided illustrating an example of building a contextual dictionary, such as the contextual dictionary 450 of FIG. 4.

As shown, PDD linkages 610 is provided. PDD linkages 610 includes a combination of items that include buttons (e.g., Delete ERS PO and Open table), titles (e.g., Compact and Repair Database) and a URL (Update CAEC Members Access to Web Tool). In this illustrative example, PDD linkages 610 is provided in the form of a screenshot. However, such an embodiment should not be considered limiting.

Contextual dictionary entry 620 is generated based on local context content extracted from PDD linkages 610 and a global dictionary (not shown), as described above with reference to FIG. 4 and as further described below with reference to FIG. 7. For example, the local context content of the PDD linkages 610 can include phrases that are extracted using, e.g., an OCR technique. The contextual dictionary entry 620 can define what each phrase identified from the PDD linkages 610 is (e.g., a button, a title or a URL). For example, as shown, the contextual dictionary entry 620 can include phrases identified from the PDD linkages 610, as well as an identifier with respect to the type of item the phrase relates to (e.g., "Delete ERS PO and Open table @button" means that the phrase "Delete ERS PO and Open table" extracted from the PDD linkages 610 is a button).

Figure 7:
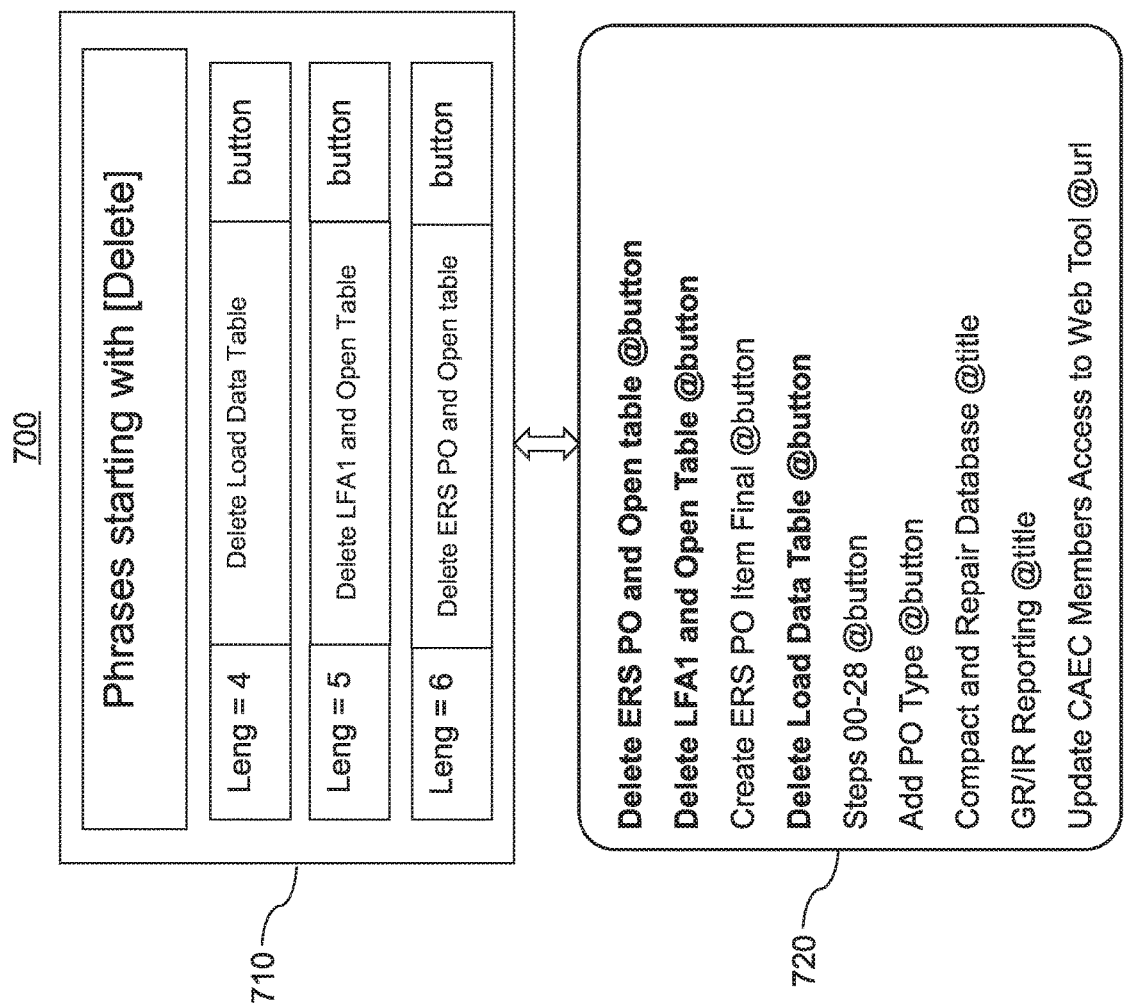
FIG. 7 is a diagram of an example global dictionary for building the contextual dictionary of FIG. 6, in accordance with an embodiment of the present invention.

With reference to FIG. 7, a diagram 700 is provided illustrating an example of the use of a global dictionary.

As shown, global dictionary section 710 is provided corresponding to phrases starting with [Delete]. The section 710 includes a phrase of length 4 starting with [Delete], "Delete Load Data Table" corresponding to a button, a phrase of length 5 starting with [Delete], "Delete LFA1 and Open Table" corresponding to a button, and a phrase of length 6 starting with [Delete], "Delete ERS PO and Open table" corresponding to a button.

Local context content is integrated with the global dictionary section 710 to determine the contextual dictionary entry 720. The context dictionary entry 720 is similar to the contextual dictionary entry 620 of FIG. 6, except that the phrases starting with [Delete] have been bolded to show the correspondence with the global dictionary section 710. As mentioned above in FIG. 4 and as will be further described below with reference to FIG. 8, a matching algorithm (e.g., maximum matching algorithm) can be used to search the global dictionary 710 based on the local context content to build the contextual dictionary entry 720.

Referring back to FIG. 4, the method proceeds to the RPA code generation portion 404. At block 460, the PDD is processed using the contextual dictionary 450. For example, processing the PDD at block 460 can include identifying one or more proper nouns from the PDD based on the contextual dictionary 450, and tokenizing the identified proper noun(s).

At block 470, RPA code is automatically generated based on the processing. In one embodiment, automatically generating the RPA code includes generating an action list based on the processing, and automatically generating the robotic process code based on the action list.

Generating the action list can include identifying an action for each step description in the process based on the identified proper nouns. To identify the action for each step description in the process, verb-object pairs can be identified.

For example, named-entity recognition (NER) can be used to identify verb-object pairs. NER is an information extraction technique that can detect and classify named-entities in unstructured text into pre-defined categories. An entity is a named-entity if it can refer to a specific object, such as a person, place, product, organization, etc. For example, in the sentence "John works at The Corporation," "John" refers to a named-entity associated with a single-token person name, and "The Corporation" refers to a named-entity associated with a two-token organization name. NER can be used to convert an unannotated block of text into an annotated block of text.

For example, a matching algorithm can be used to perform action/object identification of each step description in the process by matching terms in the contextual dictionary. In one embodiment, the matching algorithm is a maximum matching algorithm. However, other suitable matching techniques can be used to perform action/object identification in accordance with the embodiments described herein (e.g., a reverse maximum matching algorithm or a bi-directional maximum matching algorithm). As previously mentioned, further details regarding the maximum matching algorithm will be described below with reference to FIG. 8.

The matched terms determined by the matching algorithm can then be replaced with corresponding term tags defined in the contextual dictionary, and NLP tools can be used to do NLU analysis to identify the action/object in each step. The NLU analysis can be used to convert unstructured data inputs into a machine-readable structured form for machine understanding. Any suitable NLP tools that can do part of speech analysis can be used to perform the analysis. Examples of NLP tools include, but are not limited to, Natural Language Toolkit (NLTK), Stanford CORENLP, and Deep Learning based models (e.g., bidirectional long short-term memory (LSTM) network with a Conditional Random Field (CRF) layer (Bi-LSTM-CRF)).

As an illustrative example of automatically generating robotic process automation code using artificial intelligence in accordance with the embodiments described herein, take the example statement "Go to spreadsheet and copy activity sequence from Activityseq column". A first process description tokenization can be determined as "[('Go', 'VB'), ('to', 'TO'), ('spreadsheet', 'NN'), ('and', 'CC'), ('copy', 'NN'), ('Activity', 'NNP'), ('sequence', 'NN'), ('number', 'NN'), ('from', 'IN'), ('Activityseq', 'NNP'), ('column', 'NN')]. As seen, the word "copy" has been tokenized as a noun ('NN'). This is due at least in part to the individualized tokenization of the words within the phrases "Activity sequence number" and "Activityseq column", as opposed to those phrases being identified as proper nouns. To correct this, the embodiments described herein can identify each of the phrases "Activity sequence number" and "Activityseq column" each as a proper noun using a contextual dictionary built in accordance with the embodiments described herein, resulting in a second process description tokenization correctly tokenizing the word "copy" as a verb ('VB') as: [('Go', 'VB'), ('to', 'TO'), ('spreadsheet', 'NN'), ('and', 'CC'), ('copy', 'VB'), (Activity sequence number', 'NNP'), ('from', 'IN'), ('Activityseq column', 'NNP')].

At block 480, the robotic process automation code is executed for automating the process corresponding to the practical application. The robotic process automation code can be generated and executed for a variety of different processes and corresponding practical applications.

For example, the embodiments described herein can generate robotic process automation code executed for automating a data mining process. One example of a data mining process is web site scraping, where data is collected from websites based on, e.g., keywords. This data can be presented in a suitable data presentation format.

As another example, the embodiments described herein can generate robotic process automation code executed for automatic electronic message (e.g., e-mail) processing. More specifically, in response to an electronic message received by the robotic process automation system, robotic process automation code can generate an automated response, or can forward the electronic message for manual response, based on content of the received electronic message.

As yet another example, the embodiments described herein can generate robotic process automation code executed for data management (e.g., backup or restore operations). More specifically, the robotic process automation code can provide automatic data transfer between computing systems in line with data management needs, while a manual task can be created by the robotic process automation system if needed. Additionally, the embodiments described herein can be used to clean data by identifying bad quality data from a dataset based on classification rules.

As yet another example, the embodiments described herein can generate robotic process automation code executed for automating insurance-based operations. Examples of such insurance-based operations include, but are not limited to, claims processing, underwriting processing, and premium renewal processing.

As yet another example, the embodiments described herein can generate robotic process automation code executed for automating human resource and payroll operations. Examples of such human resource operations include, but are not limited to, onboarding and payroll processing.

As yet another example, the embodiments described herein can generate robotic process automation code executed for industrial process automation. Further details regarding executing robotic process automation code for industrial process automation will be described below with reference to FIG. 9.

The examples of practical applications of robotic process automation described above should not be considered limiting.

Figure 8:
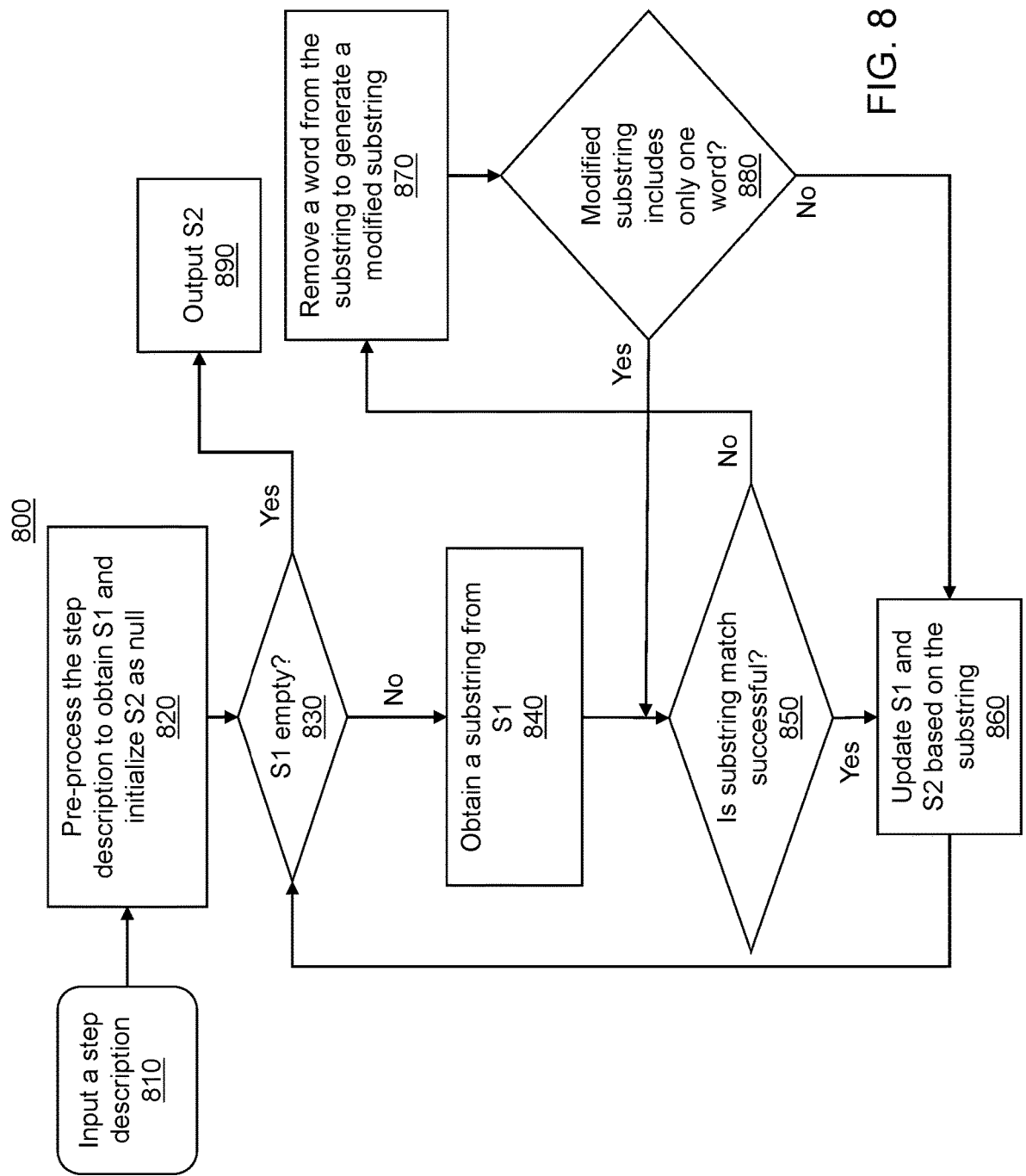
FIG. 8 is a block/flow diagram of a system/method for implementing a maximum matching algorithm, in accordance with an embodiment of the present invention.

With reference to FIG. 8, a block/flow diagram is provided illustrating a system/method 800 implementing a maximum matching algorithm. As mentioned above with reference to FIG. 4, the maximum matching algorithm is just one example of an matching algorithm that can be used in accordance with the embodiments described herein.

At block 810, a step description is input. For purposes of illustration, an example of a step description can be "Go to spreadsheet file and copy Activity sequence number from Activityseq column".

At block 820, the step description is pre-processed to generate a list of words based on the step description, referred to herein as S1, and a data structure S2 is initialized as null. The preprocessing is performed to place the input step description into a suitable format for implementation into the maximum matching algorithm. For example, a word segmentation can be performed to generate the list of words S1. Some stop words can also be removed during the preprocessing to generate the list of words S1. The data structure S2 stores any substrings of S1 determined to have a successful match, as will be described in further detail below.

At block 830, it is determined if S1 is empty.

If S1 is not empty, at block 840, a substring is obtained from S1. The substring can have a length less than or equal to a maximum bound, and the substring can be obtained starting from the left of the corresponding step description. For example, regarding the step description "Go to spreadsheet file and copy Activity sequence number from Activityseq column", a substring having length 5 can be "Go to spreadsheet file and".

At block 850, it is determined if a substring match is successful. If so, at block 860, S1 and S2 are updated based on the substring. S1 and S2 can be updated by adding the substring to S2 and removing the substring from S1. The process reverts back to block 830 to determine if updated S1 is empty. If the match is not successful at block 850, then a word is removed from substring (e.g., the last word) to generate a modified substring at block 870, and it is determined if the modified substring includes only one word at block 880. If the modified substring includes only one word, then it is determined if a modified substring match is successful at block 850. Otherwise, S1 and S2 are updated based on the modified substring at block 860.

If S1 is determined to be empty at block 830, then S2 is output at block 890.

Figure 9:
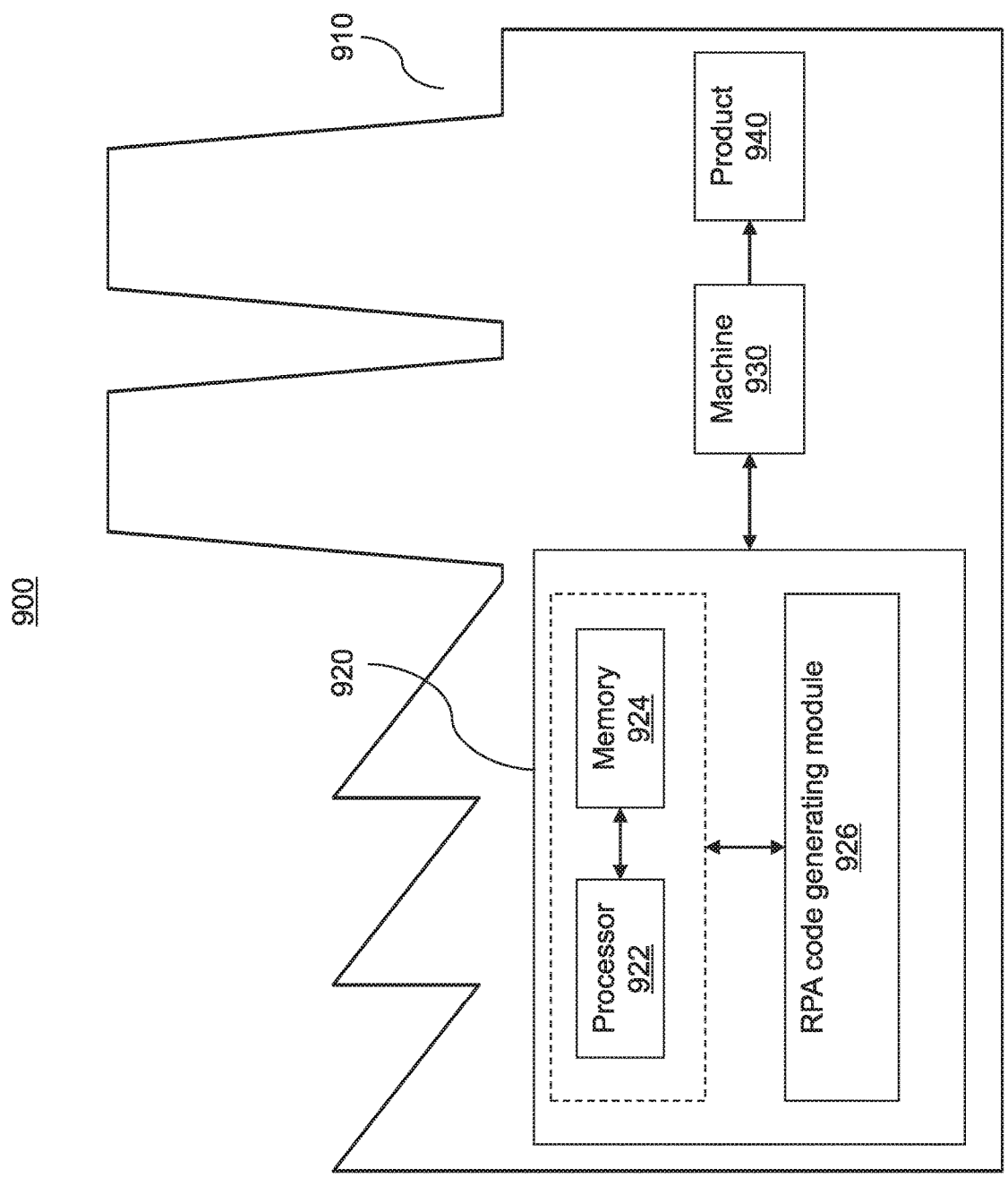
FIG. 9 is a block diagram of a system environment implementing process automation using robotic process automation code, in accordance with an embodiment of the present invention.

With reference to FIG. 9, a block diagram is provided illustrating an exemplary system environment 900. In this illustrative embodiment, the system environment 900 includes a factory 910 configured to manufacture, test and/or package products.

As shown, the factory 910 can include a control system 920 configured to automate one or more industrial processes within the factory 910. The control system 920 can include a processor 922 operatively coupled to a memory 924, and robotic process automation (RPA) code generating module 926. RPA code generating module 926 can include functionality for automatically generating RPA code in accordance with the embodiments described herein.

The environment can further include machine 930. The machine 930 can perform at least one of manufacturing, testing and/or packaging a product 940. In some embodiments, the control system 920 can execute robotic process automation code that can control the performance of the machine 930 in manufacturing, testing and/or packaging the product 940.

Additionally or alternatively, the control system 910 can execute robotic process automation code to automate one or more processes related to the manufacturing, testing and/or packaging of the product 940. For example, the control system 910 can execute robotic process automation code to manage inventory and supply chain logistics, communicate with vendors electronically, generate purchase orders, etc.

Having described preferred embodiments of automating a process using robotic process automation code (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed:

1. A system for automating a process using robotic process automation code, comprising:
   a memory device for storing program code;
   at least one processor device operatively coupled to the memory device and configured to execute program code stored on the memory device to:
      process, based on a contextual dictionary, a process description document associated with a process to be automated by a robotic process automation system;
      automatically generate robotic process automation code based on the processing using artificial intelligence; and a robot operatively coupled to the at least one processor device configured to execute the robotic process automation code for automating the process to automatically package a product, wherein the at least one processor device is configured to execute program code stored on the memory device to generate an action list based on the processing, and wherein the robotic process automation code is automatically generated based on the action list, and wherein the at least one processor device is configured to generate the action list by identifying an action for each step description in the process by identifying verb-object pairs.

2. The system of claim 1, wherein the at least one processor device is further configured to execute program code stored on the memory device to build the contextual dictionary.

3. The system of claim 1, wherein the at least one processor device is further configured to execute program code stored on the memory device to obtain the process description document, the process description document including linkages.

4. The system of claim 3, wherein the at least one processor device is configured to build the contextual dictionary by:
processing the linkages from the process description;
extracting local context content from the processed linkages using artificial intelligence;
obtaining a global dictionary; and
integrating the local context content with the global dictionary to obtain the contextual dictionary.

5. The system of claim 4, wherein the at least one processor device is configured to process the process description document based on the contextual dictionary by identifying one or more proper nouns from the process description documents using the contextual dictionary.

6. A computer-implemented method for automating a process using robotic process automation code, comprising:
processing, based on a contextual dictionary, a process description document associated with a process to be automated by a robotic process automation system;
automatically generating robotic process automation code based on the processing using artificial intelligence;
executing, by a robot, the robotic process automation code for automating the process to automatically package a product; and
generating an action list based on the processing, wherein the robotic process automation code is automatically generated based on the action list, and wherein generating the action list further includes identifying an action for each step description in the process by identifying verb-object pairs.

7. The method of claim 6, further comprising building the contextual dictionary.

8. The method of claim 6, further comprising obtaining the process description document, the process description document including linkages.

9. The method of claim 8, wherein building the contextual dictionary further includes:
processing linkages from the process description;
extracting local context content from the processed linkages using artificial intelligence;
obtaining a global dictionary; and
integrating the local context content with the global dictionary to obtain the contextual dictionary.

10. The method of claim 6, wherein processing the process description document based on the contextual dictionary further includes identifying one or more proper nouns from the process description documents using the contextual dictionary.

11. A computer program product comprising a non-transitory computer readable storage medium having program instructions embodied therewith, the program instructions executable by a computer to cause the computer to perform a method for automating a process using robotic process automation code, the method performed by the computer comprising:
processing, based on a contextual dictionary, a process description document associated with a process to be automated by a robotic process automation system;
automatically generating robotic process automation code based on the processing using artificial intelligence;
executing, by a robot, the robotic process automation code for automating the process to automatically package a product; and
generating an action list based on the processing, wherein the robotic process automation code is automatically generated based on the action list, and wherein generating the action list further includes identifying an action for each step description in the process by identifying verb-object pairs.

12. The computer program product of claim 11, wherein the method further includes obtaining the process description document, the process description document including linkages.

13. The computer program product of claim 12, wherein the method further includes building the contextual dictionary, including:
processing linkages from the process description;
extracting local context content from the processed linkages using artificial intelligence;
obtaining a global dictionary; and
integrating the local context content with the global dictionary to obtain the contextual dictionary.

14. The computer program product of claim 11, wherein processing the process description document based on the contextual dictionary further includes identifying one or more proper nouns from the process description documents using the contextual dictionary.

\* \* \* \* \*